(12) United States Patent
McAuliffe et al.

(10) Patent No.: US 7,342,332 B2
(45) Date of Patent: Mar. 11, 2008

(54) AIR BEARING AND MOTOR COOLING

(75) Inventors: Christopher McAuliffe, Windsor, CT (US); Craig M. Beers, Wethersfield, CT (US); Thomas Zywiak, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 3 days.

(21) Appl. No.: 10/992,431

(22) Filed: Nov. 18, 2004

(65) Prior Publication Data

US 2006/0061222 A1     Mar. 23, 2006

Related U.S. Application Data

(60) Provisional application No. 60/612,268, filed on Sep. 22, 2004.

(51) Int. Cl.
*H02K 9/00* (2006.01)

(52) U.S. Cl. .............................. 310/58; 310/59; 310/90; 417/423.12; 417/366

(58) Field of Classification Search .................. 310/58, 310/59, 61, 90; 417/423.12, 366; 62/505; 384/107
See application file for complete search history.

(56) References Cited

U.S. PATENT DOCUMENTS

| | | | | | |
|---|---|---|---|---|---|
| 2,793,506 | A | * | 5/1957 | Moody | 62/505 |
| 4,764,085 | A | * | 8/1988 | Jesinger | 415/112 |
| 4,887,425 | A | * | 12/1989 | Vdoviak | 60/761 |
| 5,605,045 | A | * | 2/1997 | Halimi et al. | 60/607 |
| 6,009,722 | A | * | 1/2000 | Choi et al. | 62/505 |
| 6,099,168 | A | * | 8/2000 | Sishtla | 384/549 |
| 6,450,781 | B1 | * | 9/2002 | Petrovich et al. | 417/350 |
| 6,455,964 | B1 | * | 9/2002 | Nims | 310/90 |

* cited by examiner

*Primary Examiner*—Karl Tamai
(74) *Attorney, Agent, or Firm*—Carlson, Gaskey & Olds

(57) ABSTRACT

A motor includes a housing including separate motor and bearing cooling inlets. A motor is arranged within the housing and includes a stator and rotor assembly that is supported on air bearings. The motor cooling inlet is in fluid communication with the stator, and the bearing cooling inlet is in fluid communication with the air bearings. A vent is arranged in the housing and is common to the motor and bearing cooling inlets. The vent is in fluid communication with a low pressure side of a ram air duct. The bearing cooling duct is in fluid communication with a high pressure side of a ram air duct, such as through a reverse J-tube. A differential pressure between the high and low pressure sides moves cooling fluid from the bearing cooling inlet to the vent to cool the bearings.

9 Claims, 2 Drawing Sheets

AIR BEARING AND MOTOR COOLING

This applications claims priority to U.S. Provisional Patent Application Ser. No. 60/612,268, filed Sep. 22, 2004.

BACKGROUND OF THE INVENTION

This invention relates to an air bearing and motor cooling arrangement.

Electric motors have several significant sources of heat that must be cooled to ensure desired operation of the motor. One significant source of heat is generated by the stator producing a magnetic field to drive a rotor assembly. Another significant source of heat is generated by bearings used to support the rotor assembly. In some high temperature motor applications, air bearings are used.

The air bearings and stator of an electric motor have been cooled using two airflow paths that are separate from one another. That is, the airflow paths have separate inlets and separate outlets. As a result of using separate flow paths, the bearings are subject to different loads based upon the different pressures in the flow paths that are exerted on the rotor assembly, bearings, and seals. The imbalance of load on the bearings increases the load on a thrust bearing used to support the rotor assembly, which is undesirable.

Cooling the air is typically provided from a pressurized air source, which reduces the efficiency of the component providing the pressurized air. Further, in the event of a failure of that component, flow of cooling air to the electric motor will cease possibly resulting in a failure of the electric motor.

What is needed is improved cooling flow paths and a more efficient manner in which to provide the electric motor with cooling air.

SUMMARY OF THE INVENTION

The present invention relates to a motor comprising a housing including separate motor and bearing cooling inlets. A motor is arranged within the housing and includes a stator and rotor assembly that is supported on air bearings. The motor cooling inlet is in fluid communication with the stator, and the bearing cooling inlet is in fluid communication with the air bearings. A vent is arranged in the housing and is common to the motor and bearing cooling inlets.

The vent is in fluid communication with a low pressure side of a ram air duct. The bearing cooling duct is in fluid communication with a high pressure side of a ram air duct, such as through a reverse J-tube. A differential pressure between the high and low pressure sides moves cooling fluid from the bearing cooling inlet to the vent to cool the air bearings.

Accordingly, the present invention provides improved cooling flow paths and a more efficient manner in which to provide the electric motor with cooling air.

These and other features of the present invention can be best understood from the following specification and drawings, the following of which is a brief description.

DETAILED DESCRIPTION OF THE PREFERRED EMBODIMENT

Figure 1:
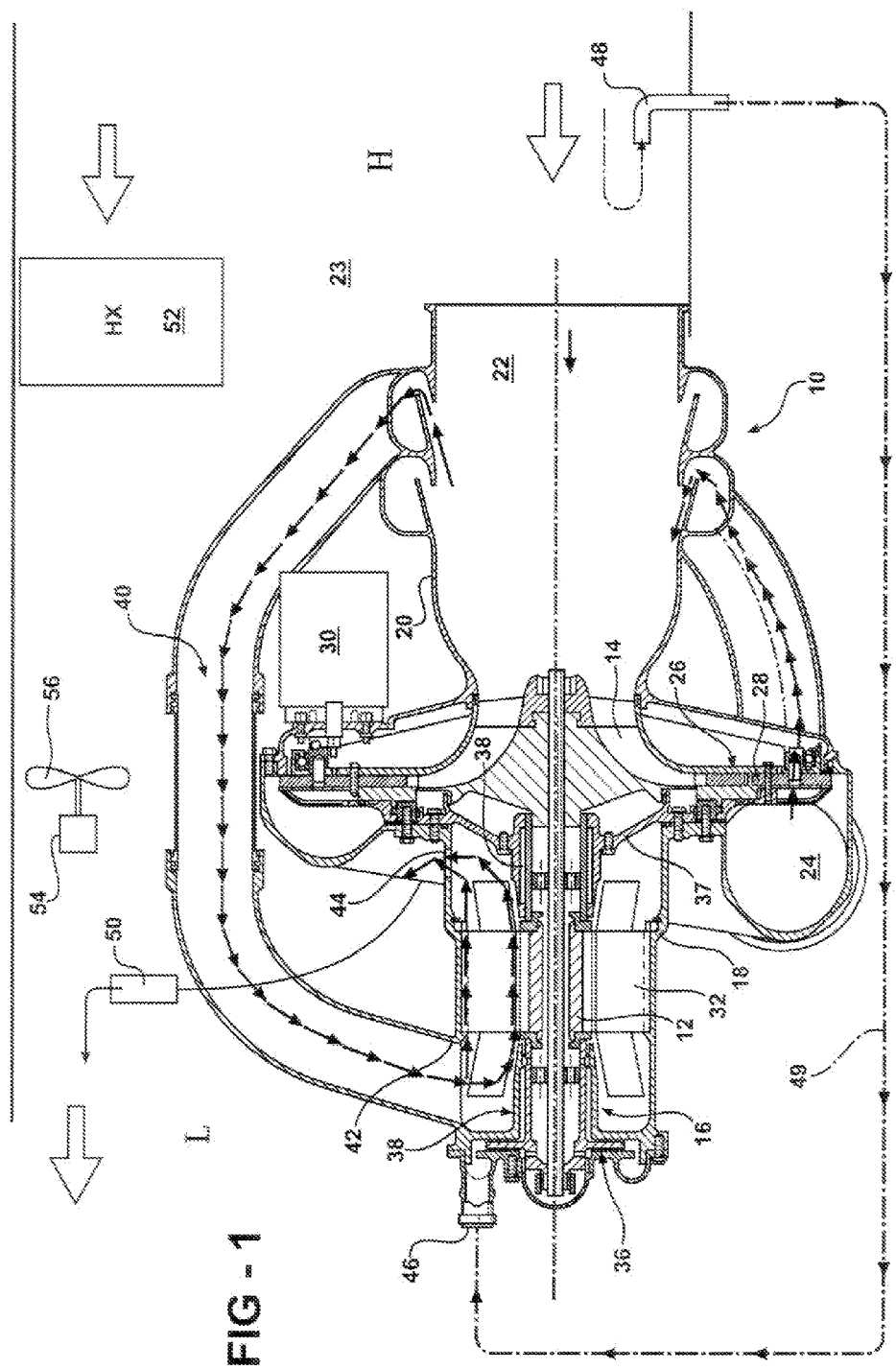
FIG. 1 is a cross-sectional view depicting cooling flow to a motor stator.

A compressed air unit 10 is shown in FIG. 1. The unit 10 includes a compressor rotor 12 supporting rotor blades 14. An electric motor 16 rotatably drives the compressor rotor 12.

The motor 16 is arranged in a motor housing 18, and a compressor housing 20 is secured to the motor housing 18. The compressor housing 20 provides a compressor inlet 22 for supplying air to the rotor blades 14. In the example shown, the compressor inlet 22 receives air from a ram air duct 23. The rotor blades 14 compress the air and provide compressed air to a compressor outlet 24.

A diffuser 26 is arranged between the rotor blades 14 and the compressor outlet 24 to vary the flow through the compressed air unit 10. The diffuser 26 includes vanes 28 that are moved by an actuator 30 to vary an inlet throat diameter provided by the vanes 28 thereby varying the flow through the compressed air unit 10.

The motor 16 includes a stator 32 arranged within the motor housing 18 that produces a magnetic field, which generates heat, causing the compressor rotor 12 to rotate. The compressor rotor 12 is supported by a thrust bearing 36 and journal bearings 38 arranged on either end of the compressor rotor 12, in the example shown. A support 37 is secured to the motor housing 18 to support one of the journal bearings 38.

A passage 40 is in fluid communication with the compressor inlet 22 and provides cooling fluid to a motor cooling inlet 42 that is in fluid communication with the interior of the motor housing 18. A vent 44 is provided in the motor housing 18. The compressor inlet 22 is on a high pressure side H, and the vent 44 is on a low pressure side L. The vent 44 is fluidly connected to an outlet 50 arranged in the ram air duct 23. The pressure differential between the high and low pressure sides H and L move cooling fluid through the motor cooling inlet 42 to cool the stator 32, as indicated by the arrows in FIG. 1. As a result, pressurized air from a source, such as engine bleed air, is not needed to provide cooling flow.

Figure 2:
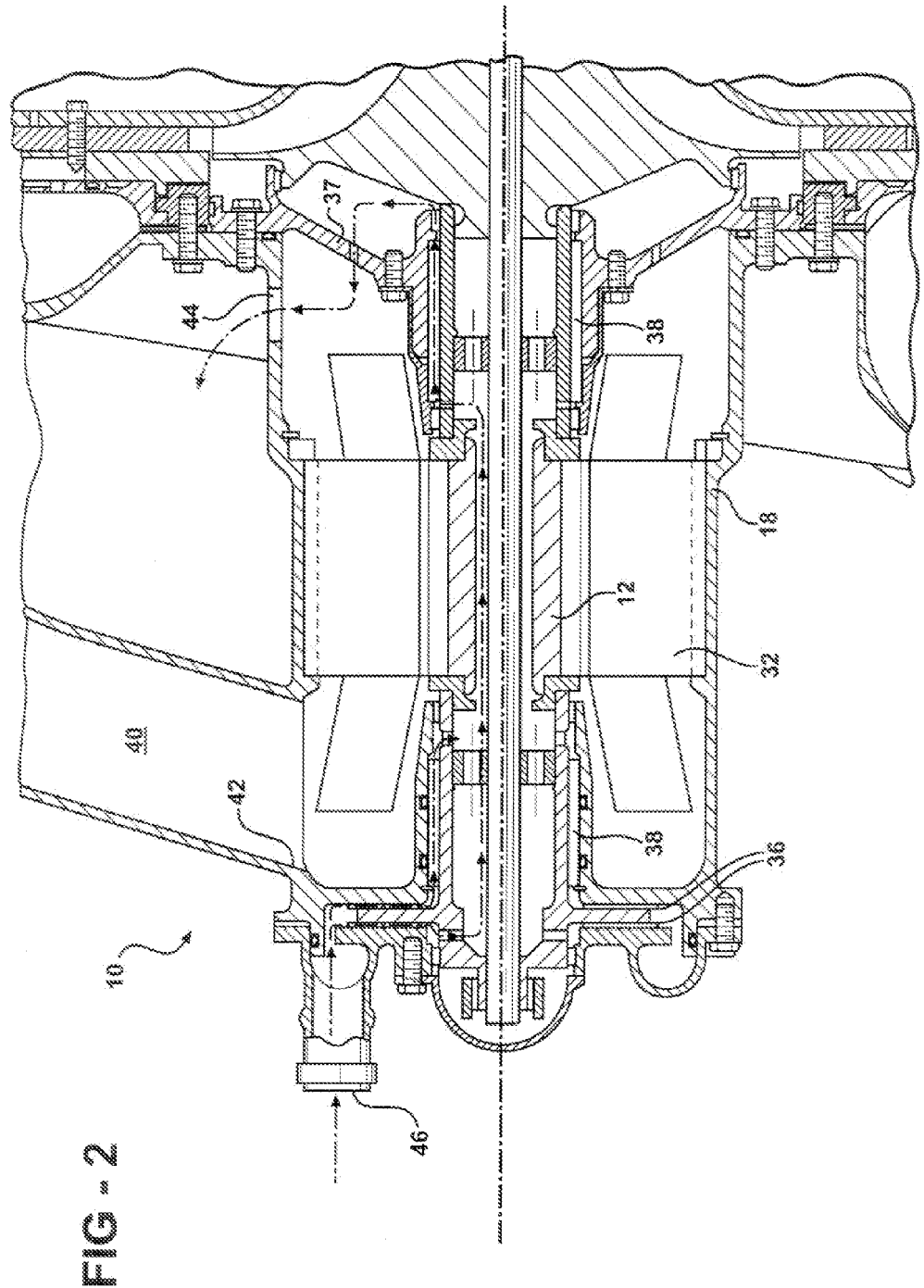
FIG. 2 is an enlarged cross-sectional view of the motor shown in FIG. 1 depicting cooling flow through air bearings of the motor.

A bearing cooling inlet 46 is provided on the motor housing 18 to cool the bearings 36 and 38. A reverse J-tube 48 is provided on the high pressure side H of the ram air duct 23. The reverse J-tube 48 filters the air from the ram air duct 23, as is known in the art. A passage 49 fluidly connects the reverse J-tube 48 to the bearing cooling inlet 46. Clean cooling fluid flows from the reverse J-tube 48 on the high pressure side H into the bearing cooling inlet 46 and out the vent 44 on the low pressure side L. As a result, pressurized air from a source, such as engine bleed air, is not needed to provide cooling flow. The cooling fluid flows through the motor housing 18 to cool the bearings 36 and 38 as indicated by the arrows shown in FIG. 2.

The outlet 50 may be arranged downstream of a fan 56 driven by an electric motor 54 arranged within the ram air duct 23. The compressor inlet 22 may be arranged downstream from a heat exchanger 52 within the ram air duct 23 and before the fan 56. The heat exchanger 52, electric motor 54 and fan 56 may be part of an air conditioning pack. The compressed air unit 10 may be used to provide pressurized air to the air conditioning pack.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A motor comprising:
   a housing including separate motor and bearing cooling inlets respectively providing cooling air to motor and bearing cooling paths arranged parallel and separate to one another;
   a motor arranged within the housing and including a stator and a rotor assembly supported on air bearings, the motor cooling inlet in fluid communication with the stator which is arranged in the motor cooling path, and the bearing cooling inlet in fluid communication with the air bearings which is arranged in the bearing cooling path;
   a vent in the housing through which the cooling air from both the motor and bearing cooling paths exit; and
   wherein the rotor assembly includes rotor blades supported on a rotor, the motor cooling inlet is in fluid communication with a compressor inlet provided by the housing, cooling air flowing from the compressor inlet to the motor cooling inlet bypassing the rotor blades.

2. The motor according to claim 1, wherein the compressor inlet receives air from a ram air duct.

3. The motor according to claim 2, wherein the compressor inlet is arranged downstream of a heat exchanger in the ram air duct.

4. The motor according to claim 2, wherein the compressor inlet is arranged upstream of a fan in the ram air duct, the air entering the compressor inlet having avoided the fan.

5. The motor according to claim 2, wherein the ram air duct has high and low pressure sides, the vent arranged on the low pressure side and the motor and bearing cooling paths arranged on the high pressure side.

6. The motor according to claim 5, wherein the cooling air exiting the vent avoids entering the rotor blades.

7. A motor comprising:
   a housing including separate motor and bearing cooling inlets respectively providing cooling air to motor and bearing cooling paths arranged parallel and separate to one another;
   a motor arranged within the housing and including a stator and a rotor assembly supported on air bearings, the motor cooling inlet in fluid communication with the stator which is arranged in the motor cooling path, and the bearing cooling inlet in fluid communication with the air bearings which is arranged in the bearing cooling path; and
   a vent in the housing through which the cooling air from both the motor and bearing cooling paths exit, wherein the vent is in fluid communication with a low pressure side of a ram air duct, and the bearing cooling inlet is in fluid communication with a high pressure side of a ram air duct, a differential pressure between the high and low pressure sides moving cooling fluid from the bearing cooling inlet to the vent.

8. The motor according to claim 7, wherein a reverse J-tube in fluid communication with the bearing cooling inlet is arranged in the high pressure side of the ram air duct, the reverse J-tube having an opening at a terminal end that faces in direction opposite a direction of airflow through the ram air duct.

9. The motor according to claim 8, the rotor assembly including a rotor supporting rotor blades, a passage interconnecting the reverse J-tube to the bearing cooling inlet, cooling air within the passage having avoided passing through the rotor blades.

* * * * *